United States Patent Office.

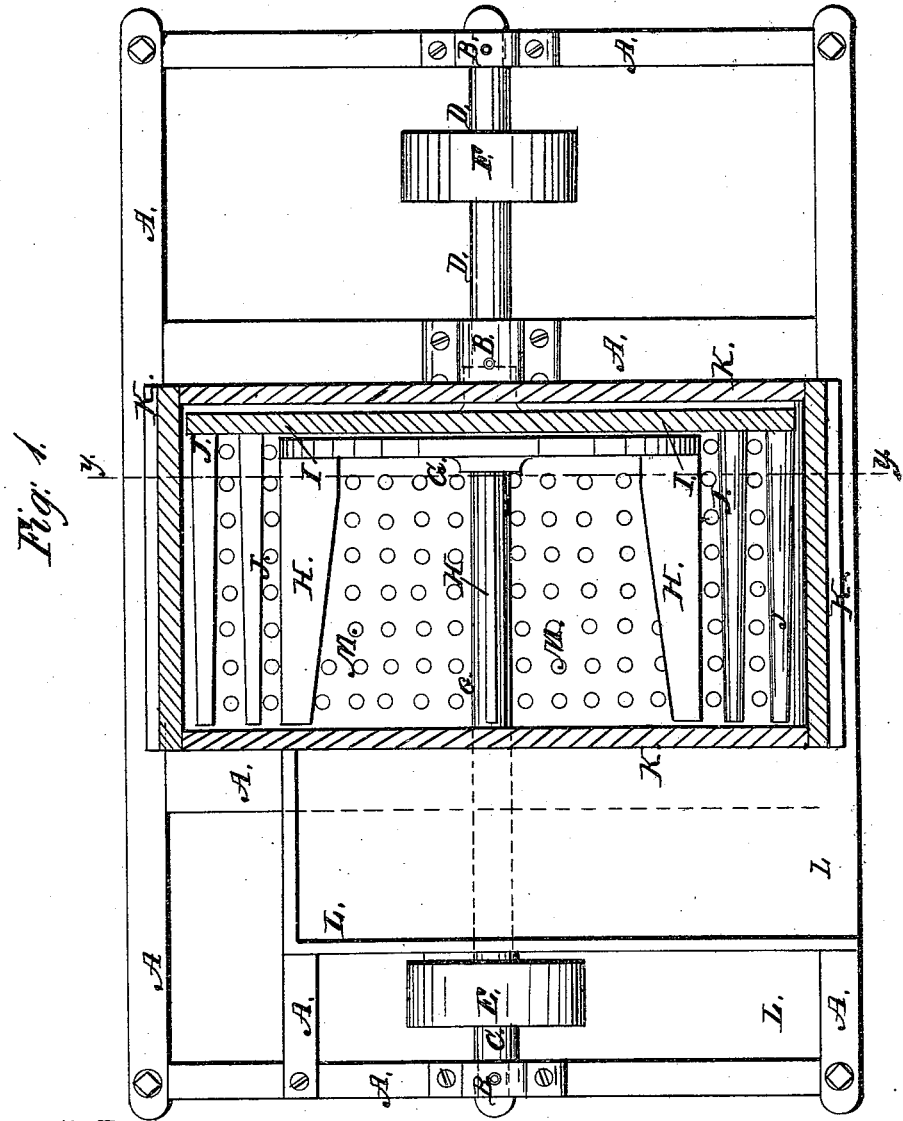

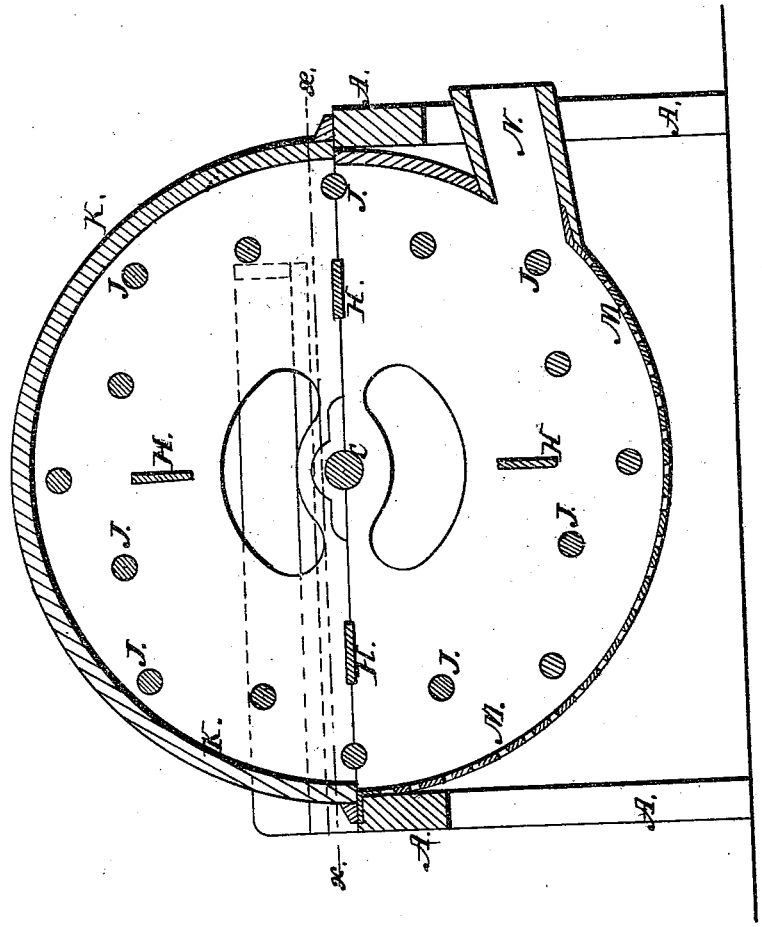

SAMUEL FAY, OF LOWELL, MASSACHUSETTS.

Letters Patent No. 61,411, dated January 22, 1867.

---

IMPROVEMENT IN MACHINE FOR OPENING AND CLEANING COTTON.

---

The Schedule referred to in these Letters Patent and making part of the same.

---

TO ALL WHOM IT MAY CONCERN:

Be it known that I, SAMUEL FAY, of Lowell, in the county of Middlesex, and State of Massachusetts, have invented a new and improved Machine for Opening and Cleaning Cotton, &c.; and I do hereby declare that the following is a full, clear, and exact description thereof, which will enable others skilled in the art to make and use the same, reference being had to the accompanying drawings, forming part of this specification, in which—

Figure 1 is a top or plan view of my improved machine, partly in section through the line $x\ x$, fig. 2.

Figure 2 is a vertical cross-section of the same, taken through the line $y\ y$, fig. 1.

Similar letters of reference indicate like parts.

This invention is designed to furnish an improved machine for opening and cleaning cotton and other fibrous substances in a thorough manner, without injuring the fibre, or rolling or curling it, as is the case when opened by ordinary means, and which shall be equally applicable to other uses. And it consists in the combination of two beaters, arranged the one within the other, and revolved with the same or different velocities in the same or opposite directions, as hereinafter more fully described.

A is the frame of the machine, in which are formed the bearings B of the shafts C and D. E and F are pulleys attached to the shafts C and D for the reception of the belts, by means of which motion is communicated to the machine. To the end of the shaft C is attached a disk, G, from the face of which project a series of wings or arms, H. When the disk G is made about eighteen inches in diameter, the wings H should be about six inches long. The wings or beaters H may be made in the form shown in figs. 1 and 2, or they may be made wider or narrower, according to the work to be done. The number of the wings H may also be varied as desired. To the end of the shaft D is attached a disk, I, in such a position as to be parallel with and close to the disk G. The disk I should be about twenty-nine inches in diameter. From the part of the disk I extending beyond the disk G project arms or beaters, J, of about the same length as the wings H, as shown in fig. 1. Any desired number of arms, J, may be employed, according to the character of the work to be done. If desired, the wings H may be attached to the outer or larger disk. K is a cover which may be placed over the operating part of the machine when desired, and which should have an opening formed through it for the admission of the cotton or other substance to be operated upon. The material may be fed to the machine through trunks, or it may be placed by hand upon an apron, or fed from a table, L, as shown in fig. 1. M is a screen, placed beneath the beaters, through which the dirt escapes, and the cotton or other substance passes out through the spout N; or any other desired arrangement may be made for separating the dirt. It should be observed that the dimensions herein given are merely suggested, and that the relative dimensions of the parts may be varied indefinitely without departing from my invention.

This machine has been described as applied to opening and cleaning cotton and other fibrous substances, but it is equally applicable to various other uses, such as threshing and cleaning grain, &c.

I claim as new, and desire to secure by Letters Patent—

The combination of the beaters G H and I J, arranged the one within the other, and revolved with the same or different velocities, and in the same or opposite directions, substantially as herein shown and described.

SAM'L FAY.

Witnesses:
 LANDON ADAMS,
 LEVI FERGUSEN.